Patented July 6, 1937

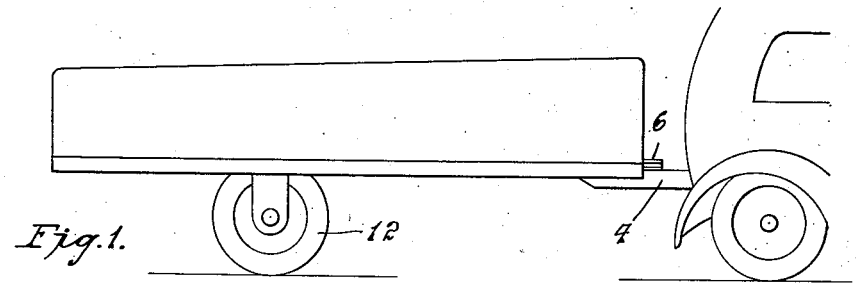
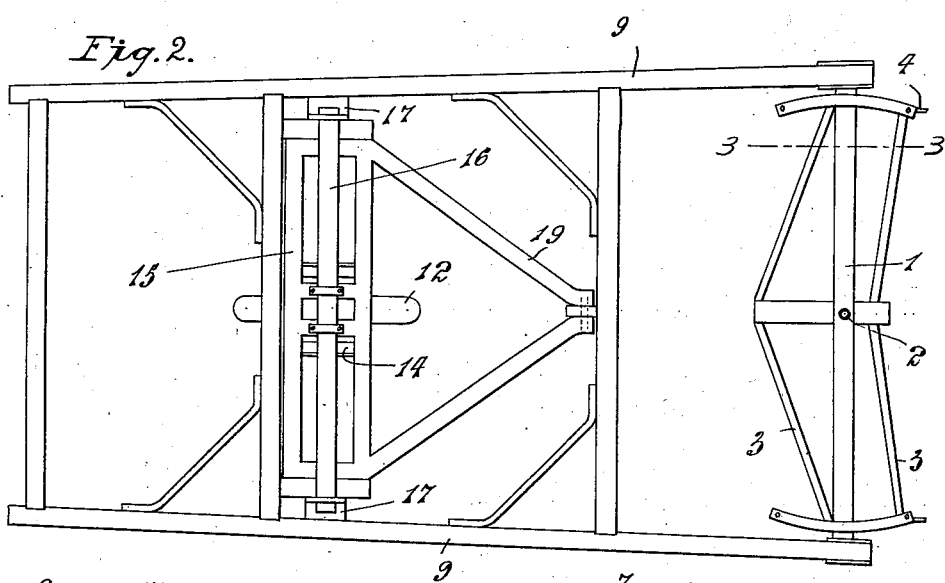
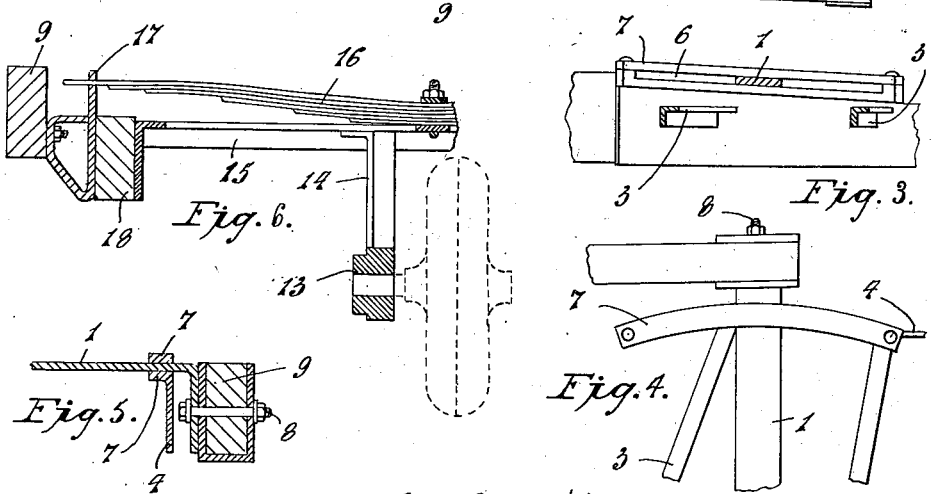

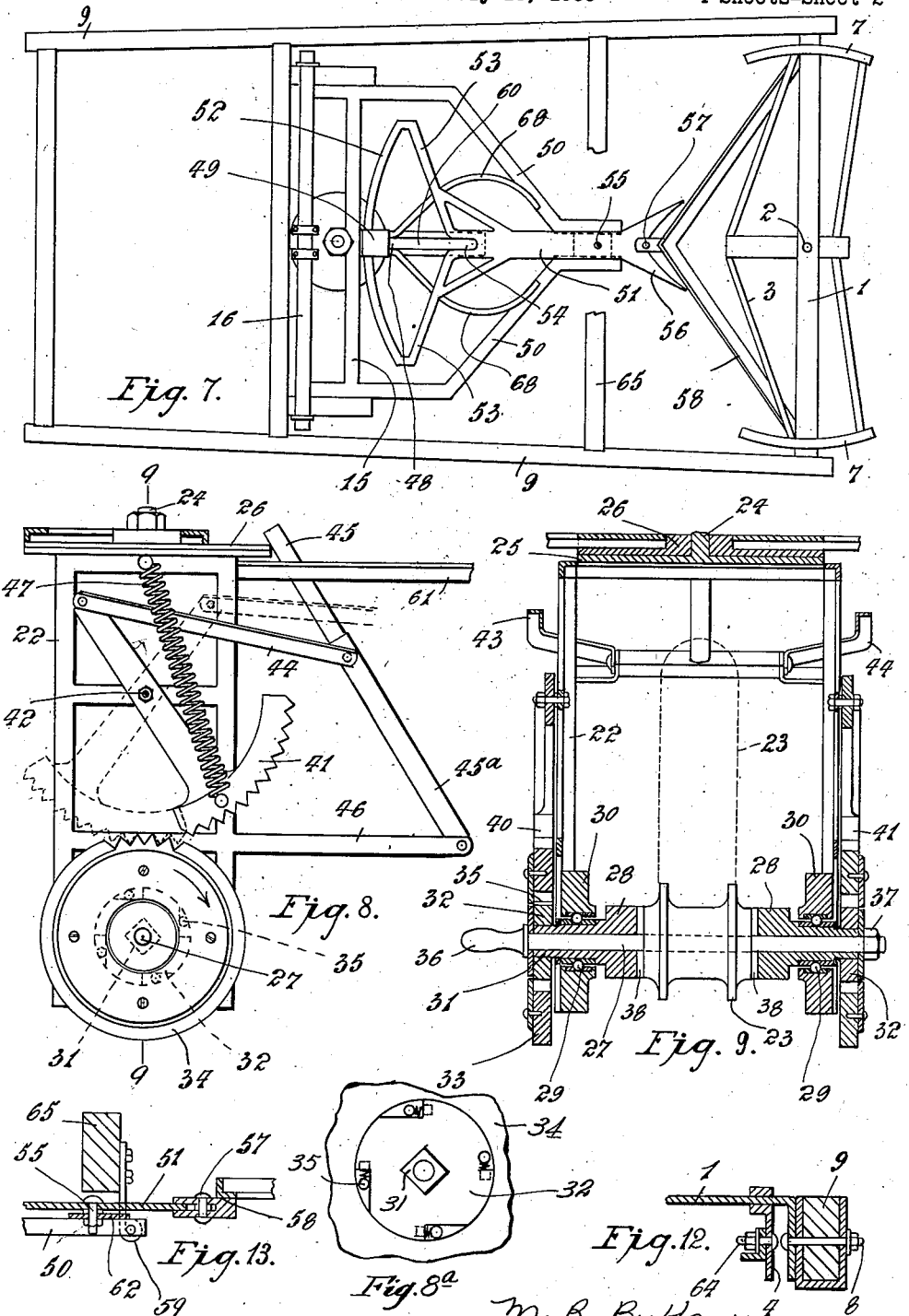

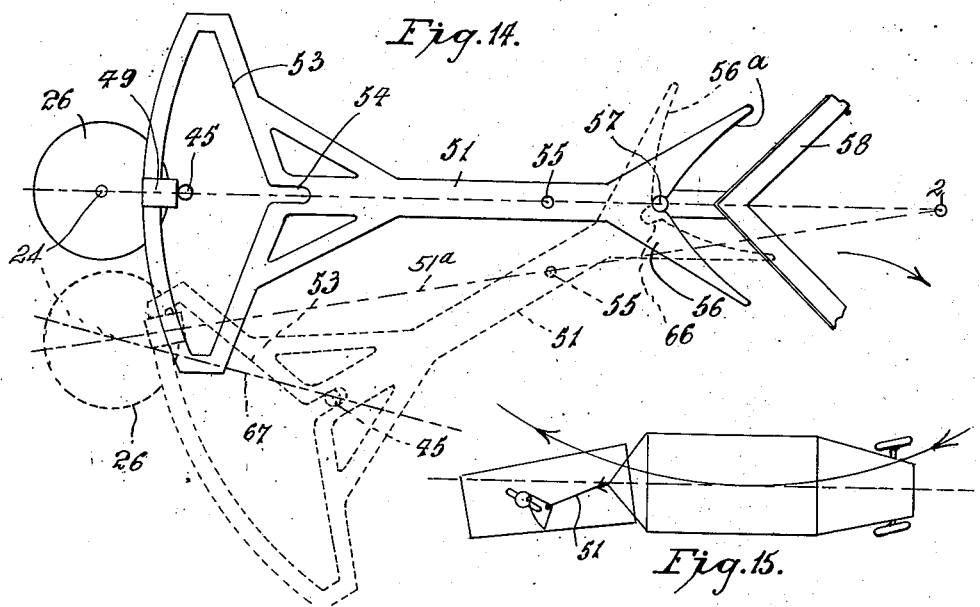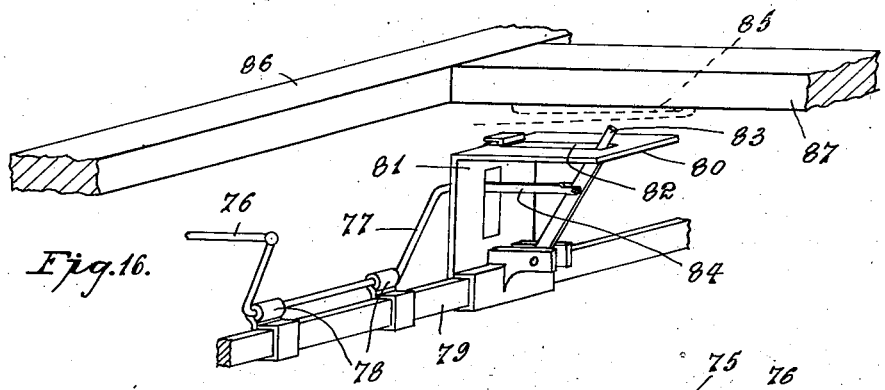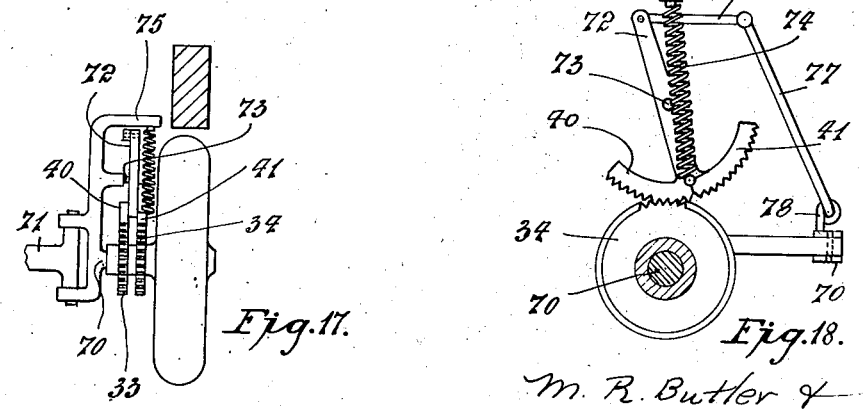

2,086,291

UNITED STATES PATENT OFFICE 2,086,291

TRAILER FOR ROAD VEHICLES

Martin Ronald Butler, Wellington, and William Henry Harding, Levin, New Zealand, assignors to Reversible Trailers Limited, Levin, Province of Wellington, New Zealand, a company incorporated in New Zealand Application July 18, 1935, Serial No. 32,080 In New Zealand August 10, 1934

8 Claims. (Cl. 280—33.5)

This invention relates to trailers for road vehicles.

The object of the present invention is to enable the tracking of a trailer to conform to that of the vehicle when reversing.

According to the present invention, means are provided to permit the automatic tracking of the trailer when reversing. This is accomplished by having an automatic direction shifting device which, when the vehicle is reversed, will operate means to change the trailer wheel to the direction in which the reversing is taking place. These means are such that when the forward movement of the vehicle takes place, the trailer wheel will be brought to its correct forward alignment and be retained in such position for forward travel.

The invention will be described with the aid of the accompanying drawings, wherein:—

Figure 1 is an elevation showing a trailer attached to a vehicle.

Figure 2 is a plan of a trailer but not showing the floor or sides, these being of approved form.

Figure 3 is a cross section on line 3—3 Figure 2, but drawn to a larger scale than the preceding views.

Figure 4 is a plan of the portion shown in Figure 3.

Figure 5 is a cross section showing the pivoting of the cross bar to the trailer frame.

Figure 6 is a cross section showing how the under carriage is connected to the frame of the trailer by means of a spring.

Figure 7 is a plan of the reversing mechanism applied to the trailer.

Figure 8 is a side elevation of the trailer wheel frame showing a portion of the reversing mechanism, but drawn to a larger scale than the preceding view.

Figure 8a is a fragmentary side elevation of one of the ratchet pinions 32.

Figure 9 is a cross section on line 9—9 Figure 8.

Figure 12 is a cross section showing a detail of the horizontal pivoting of the draw bar.

Figure 13 is a longitudinal section showing a detail showing the connection of the direction bar and draw bar.

Figure 14 is a plan of the direction bar.

Figure 15 is a diagram showing the movement of the trailer upon reversing.

Figure 16 is a view showing the reversing mechanism applied to a two-wheeled trailer.

Figure 17 is an end view, showing the rack mechanism applied on the hub of one wheel of the two wheel trailer shown in Figure 16.

Figure 18 is a side view of the mechanism as employed with the trailer shown in Figure 17.

Figure 10:
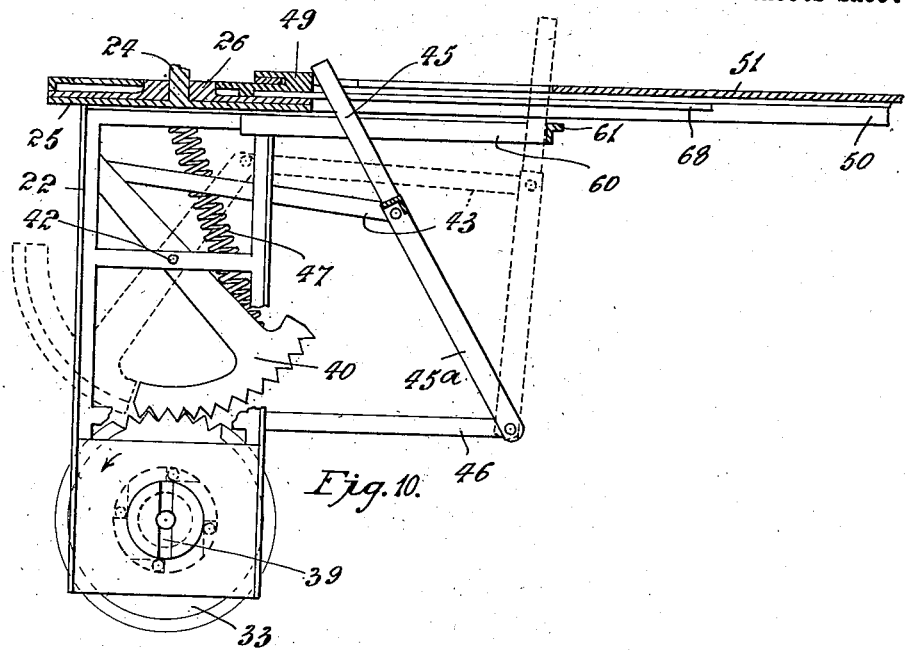
Figure 10 is a longitudinal section along line 10—10, Figure 11 below.

Referring to the drawings, the trailer coupling consists of a cross bar 1 pivoted at its centre on a pin 2 to a frame formed of bars 3 and end plates 4 which are bolted to a convenient part of the rear of the vehicle chassis, or to brackets attached to the rear thereof, according to the type of vehicle to which it is applied. The ends of the cross bar 1 slide in slots 6 formed between arcuate members 7 integral or fixed on the end plates 4 of the frame. These arcuate members slope upwards from the horizontal, as indicated in Figure 3, so that when the cross bar 1 rotates on its pivot, a tilting action is obtained which will permit the bar to take the required transverse angle in relation to the frame. The bearing about the pivot 2 would be of the same inclination as the slots 6. The bar 1 is pivoted by means of pins 8 (see particularly Figure 5) to the side members 9 of the trailer frame in order to allow the necessary flexibility between the trailer and the drawing vehicle. The guide slots 6 extend in an arcuate form with a radial centre at 2 to the required distance that would allow the trailer to pivot in accordance with the lock of the vehicle to which the bar is applied.

At a convenient point near the rear of the trailer a trailer wheel 12 is pivoted. It may be mounted by means of suitable bearings 13 in depending members 14 from a transverse frame 15 which carries a spring 16, the ends of which pass through slots of brackets 17 fixed to the side members 9 of the body of the trailer. A block 18 fixed on the side of the bracket 17 may slide against the bracket end of the frame 15 to act as a guide.

The front end of the frame extends forward and is pivoted at 19 to a transverse portion of the body of the trailer frame so that vertical movement of the rear end of the frame can take place.

This arrangement of a central wheel, together with the use of the draw bar 1, enables the frame of the trailer to assume the transverse plane of the vehicle when rounding a curve, and also any accentuated angle, such as when the vehicle is travelling around a curve where one side of the road is higher than the other.

The guides 7 retain the trailer in an upright position, while the cross bar 1 being pivoted at its centre allows the horizontal turning movement to take place between the trailer and the vehicle, while the providing of an axis at 8 allows for free movement of the trailer about such axis.

Means have also been devised to permit the automatic tracking of the trailer when reversing. This is accomplished by having an automatic direction shifting device, which, when the direction of the vehicle is changed, will operate means to change the trailer wheel to the direction in which the reversing is taking place. These means are such that when the forward movement of the vehicle takes place, the trailer wheel will be brought to its correct forward alignment, and be retained in such position for forward travel.

To carry this out, a wheel carriage frame 22 has the trailer wheel 23 pivoted therein (see Figures 8 and 9), the top of the frame having a pin 24 projecting from the upper plate 25 fixed to or forming part of the frame 22 and forming one part of a turntable. This pin and plate 25 pivot on the underside of a plate 26 which forms the other part of the turntable and is fixed to the frame 15, and may be connected to the spring 16 and to the trailer body in the manner already described and shown in Figure 6.

The axle 27 passes through the trailer wheel 23 and through sleeves 28 connected to the hub of the wheel, such sleeves having ball bearings 29 mounted thereon and retained in bearing blocks 30 fixed on the side members of the frame 22 (see Figure 9). On the squared ends 31 of the sleeves 28 ratchet pinions 32 are placed, and over the ratchet pinions 32 toothed gears 33 and 34 are fitted. Spring operated rollers 35 are fitted between the inner circumference of the toothed gears 33 and 34 and the teeth of the ratchet pinions, this free-wheel mechanism being of well known type and arranged so that the gear 33 does not rotate when the wheel 23 is travelling forwardly, while the gear 34 is locked by its ratchet 32 and is being rotated, but when the trailer wheel is moving rearwards, the opposite movement of these gears takes place.

The axle 27 is held in position by a head 36 at one end and by a nut 37 at the other end, while feathers 38 on the ends of the wheel hub fit transverse featherways 39 (see Figure 10) in the ends of the sleeves 28, so that on withdrawal of the axle, the wheel may be slid away from the sleeves.

Toothed quadrants 40 and 41 are pivoted near their centres on pins 42 to the frame 22, and their upper ends are pivoted to links 43 and 44 respectively, which links have their other ends pivoted to a locking bar 45, the lower end of this bar being forked, the members 45a thereof being pivoted to bars 46 of the frame 22.

Coil springs 47 are attached at one end to the frame 22 and at their other ends to the quadrants 40 and 41.

On arms 50 projecting from the frame 15 is pivoted a direction bar 51 at 55 on a plate 62 joining the arms 50, which bar extends rearwardly and has a loop 52 at its rear end of arcuate form which passes through a guide formed by the stop 49 on the frame 15. The loop of this bar has angular sliding surfaces 53 ending in a slot 54 into which the locking bar 45 is guided when the trailer moves in a reverse direction.

This direction bar 51 has at its front end a fork 56 which moves against a pin 57 on the end of an angular member 58 which is pivoted at its ends on pins 64 on the plates 4 (see Figure 12) of the frame in which the bar 1 is mounted, and having the same normal axis as the bar 1 has on the pins 8, so that the pin 57 may rise or fall with the frame 15 and bar 51. This member 58 is supported at its front end on the bar 51 (see Figure 13). The arms 50 are supported at their forward ends by being pivoted in a bracket 59 on a cross bar 65 of the trailer frame.

The operation of the mechanism will now be described.

In full lines in Figures 8 and 10 the position of the quadrants 41 and 40 relative to each other is shown. This is the normal forward travelling position and the wheel 23 will rotate the gear 34, but will not rotate the gear 33. The springs 47 in this position retain the bar 45 as shown in full lines and the quadrant 41 of the gear wheel 34, but the quadrant 40 (see Figure 10) remains in mesh with the gear wheel 33, while the locking bar 45, being held in the slot 48, the frame 22 cannot turn, as already described.

When, however, the movement of the vehicle is reversed and the trailer wheel 23 begins to rotate in a reverse direction, the toothed gear 33 is no longer free, but is immediately rotated in the direction of the arrow in Figure 10, and carries back the quadrant 40 towards the position shown in dotted lines, and throws the locking bar 45 out of engagement with the slot 48 towards the position shown in dotted lines, and this bar, by means of the link 44 (see Figure 8) will carry back the quadrant 41 into engagement with the toothed gear 33 which is now free to permit the meshing. When the quadrant 40 has been rotated as far as its teeth permit, the spring 47 will draw it clear of the toothed gear 33 to the position shown in dotted lines in Figure 10 and the relative position of the two quadrants is then as shown in dotted lines in both Figures 8 and 10, that is, the quadrant 41 remains in mesh with the gear 34 ready to be operated immediately forward travel commences.

Figure 11:
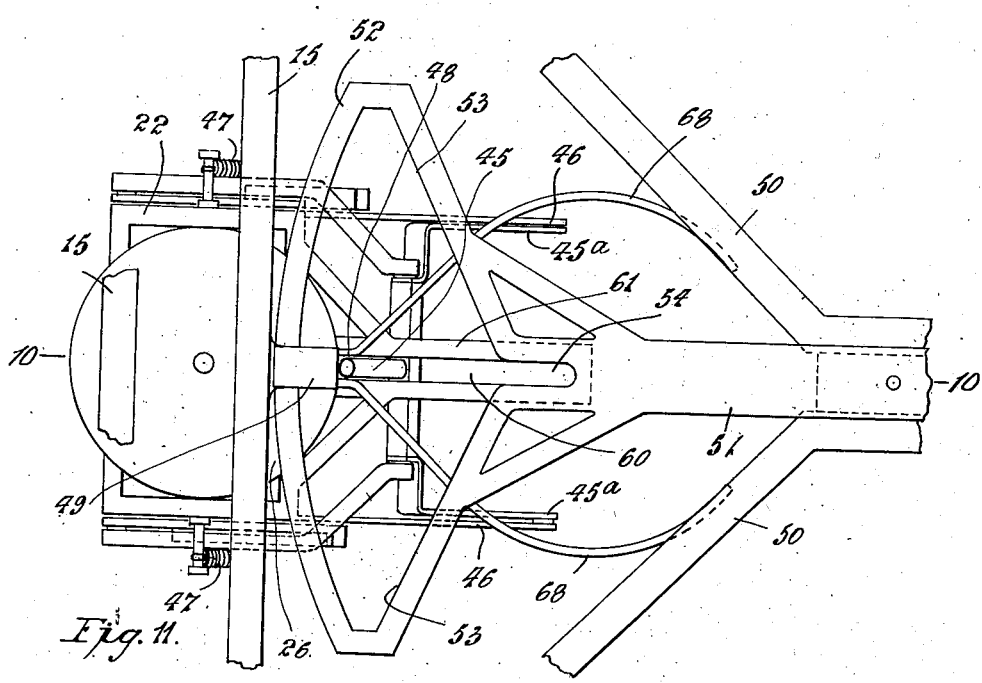
Figure 11 is a plan of the turntable and wheel control.

The bar 45 travels in a slot 60 (see Figure 11) in a projecting part 61 of the frame 22, and immediately the bar 45 is clear of the slot 48, the frame 22 is free to turn on its pivot 24, the movement, however, being limited by the guides 68 which extend from the slot 48 and are carried forward and attached to the arms 50 of the frame 15. When the bar 45 reaches its full forward movement (dotted lines in Figure 10), it will have entered the slot 54 of the bar 51. If this bar should, however, not be in alignment at the time the bar 45 moves forward, it will strike an edge 53 and be guided into the slot 54.

The operation of this direction bar is shown in Figures 14 and 15.

When the vehicle is thus reversing, the trailer tends to swing in the direction opposite to that in which the vehicle is turning, as shown in the diagram in Figure 15, line 51a Figure 14 showing the new alinement. This movement of the trailer carries the pivot point 55 out of alignment with the centre line of the pin 57 and pivot point 2 thereby increasing the distance between the pivot 55 and the pin 57, thereby causing a slot 66 in the fork to move out of engagement with the pin 57. This movement, owing to pressure of the inner side of the slot against the pin, throws the bar 51 out of alignment with the centre line 51a of the trailer as shown in dotted lines.

The reverse rotation of the trailer wheel has, however, caused the locking bar 45 to move forward into the slot 54 as already described so that when the bar 51 swings to the position in dotted lines in Figure 15 it will also swing the frame 22 on its pivot 24 to the new alignment indicated by the dotted line 57 in Figure 14, thus turning the trailer wheel into position for reversing with the vehicles.

During the reversing, the quadrant 41 has been brought into gear with the gear wheel 34 as above described, as shown in dotted lines in Figure 8, but on the forward movement the gear 34 now rotating with the wheel 23 of the quadrant 41 is carried forward to the position shown in full lines and returns the locking bar 45 to engagement with the slot 48, being guided in its rearward movement against a guide 68. As the trailer now adjusts itself to the alignment of the vehicle, the pin 57 returns the bar 51 to its correct alignment.

When the trailer is following the lock of the vehicle in a forward direction, i. e. the direction of the arrow in Figure 14, the first movement is to throw the bar 51 from the position in full lines to the position shown in dotted lines, but the locking bar 45 will not be affected as this has already returned to its position in the slot 48, and as the locking of the vehicle becomes more acute the pin 57 will disengage from the slot 66 and move along the curved face of the fork 56a. In the event of the vehicle stopping on a forward lock, the bar 51 is thus in a position, immediately the vehicle commences to reverse, to guide the locking bar as it moves forward against an edge 53 to the slot 54, and thus turn the frame 22 and the trailer wheel in the direction necessary to return the trailer to the correct alignment behind the vehicle.

In Figures 16 to 18, there is shown a method of applying the reversing mechanism to a two-wheeled trailer, and in this case the wheels are mounted on stub axles 70 pivoted on the end of an axle 71 in the same manner as the front wheels of a motor vehicle. On the hub of the wheel, the two gear wheels 33 and 34 are placed side by side, having the same free wheel mechanism as previously described. The quadrants 40 and 41 are placed one on each side of a central lever 72 which is pivoted to a pin 73 from the stub axle, this lever having a coil spring 74 to retain it clear of the gear 43, such pin being carried from a pin on a bracket 75 from the stub axle.

A link 76 connects the lever 72 to the upper end of a U shaped member 77 mounted in bearings 78 on the tie rod 79 connecting the two stub axles. A plate 80 forming the upper part of a bracket 81 is fixed on the tie rod. A slot 82 in this plate has working in it a bar 83, corresponding to the locking bar 45, which is connected by a link 84 to the U shaped member 77. Guides 85 for the same purpose as the guides 68 are attached to a frame 86 conveniently mounted from the axle 75. The direction bar 51 may be pivoted beneath the part 87 of the frame 88, while member 58 is attached to the rear of the vehicle and has its horizontal pivots in line with the horizontal pivot of the universal joint connecting the draw bar to the vehicle which draw bar may be an extension of the part 87.

The operation is that, as the direction bar 51 is moved out of alignment when reversing, the bar 83 will be moved along the angular edge 53 and will travel laterally, except that instead of it moving in an arc as does the bar 45, it will move transversely and thus carry with it the tie rod 79 and control the direction of the wheels.

What we claim is:—

1. In trailers for road vehicles, a trailer frame, a wheel frame movable about a vertical axis on the trailer frame, a supporting wheel mounted in the wheel frame and adapted for steering movement about said vertical axis, a direction bar pivoted to the trailer frame, actuating means movable horizontally with the vehicle and coupled with the front end of said direction bar and adapted when the trailer swings out of alignment with the road vehicle to move the direction bar out of alignment with the trailer, the rear end of said direction bar controlling the steering movement of the wheel frame and wheel mounted therein.

2. In the apparatus as claimed in claim 1, the rear end of the direction bar having an opening, a locking bar controlling the turning movement of the wheel frame about its axis and projecting into the opening, means whereby upon the reverse movement of the trailer said locking bar is moved forward and actuated by the sides of the bar within the opening to the necessary lateral direction and turn the wheel frame and wheel mounted therein to track in alignment with the vehicle.

3. In the apparatus as claimed in claim 1, gear wheels on the axle of a wheel of the trailer, freewheel mechanism between said gear wheels and the axle whereby one gear wheel rotates with the axle in one direction and the other gear with the axle in the other direction, quadrants pivoted to the wheel frame and adapted to mesh with said gear wheels, a locking bar engageable with the direction bar, said quadrants connected to said locking bar whereby on the forward travel one gear wheel will rotate the related quadrant and retain the locking bar out of engagement with the direction bar but on rearward travel the other quadrant will be rotated to project the locking bar into engagement with the direction bar.

4. In the apparatus as claimed in claim 1, gear wheels on the axle of a wheel of the trailer, freewheel mechanism between said gear wheels and the axle whereby one gear wheel rotates with the axle in one direction and the other gear with the axle in the other direction, quadrants pivoted to the wheel frame and adapted to mesh with said gear wheels, a locking bar engageable with the direction bar, said quadrants being connected to said locking bar whereby on the forward travel one gear wheel will rotate the related quadrant and retain the locking bar out of engagement with the direction bar, but on rearward travel the other quadrant will be rotated to project the locking bar into engagement with the direction bar, a spring attached to each quadrant and to said wheel frame finally to disengage said quadrant from its gear wheel when the movement of the locking bar controlled by such gear has taken place.

5. In the apparatus as claimed in claim 1, the direction bar having a fork at one end, a slot in the fork in which a pin of the actuating means normally rests but as the trailer moves out of alignment with the vehicle, the slot will move away from the pin so that on further movement of the bar said pin will be free to move along an arcuate edge of the fork.

6. In the apparatus as claimed in claim 1, a locking bar controlling the turning movement of the wheel frame, the rear end of the direction bar having a loop and a retaining slot therein, said locking bar projecting into the loop, angular faces within the loop against which the locking bar is guided into said slot at the junction of the angular faces on the reverse movement of the trailer.

7. In trailers for road vehicles, a trailer frame, a wheel frame below said trailer frame, supporting wheel means mounted in the wheel frame and movable about a vertical axis for steering movement, a direction bar pivoted to the trailer frame, actuating means movable horizontally with the vehicle and coupled with the front end of said direction bar and adapted when the trailer swings out of alignment with the road vehicle to move the direction bar out of alignment with the trailer in the same direction, the rear end of said direction bar controlling the steering movement of the wheel means.

8. In trailers for road vehicles, a trailer frame, a wheel frame below said trailer frame, supporting wheel means mounted in the wheel frame and movable about a vertical axis for steering movement, a direction bar pivoted to the trailer frame, actuating means movable horizontally with the vehicle and coupled with the front end of said direction bar and adapted when the trailer swings out of alignment with the road vehicle to move the direction bar out of alignment with the trailer in the same direction, a locking bar actuated in a rearward direction and a forward direction by the respective forward and reverse turning movement of the wheel means, said locking bar being movable laterally and connected with said wheel means to impart steering movement thereto, said locking bar upon its forward movement engaging said direction bar whereby it is moved laterally by said direction bar to change the steering direction of the wheel means.

MARTIN RONALD BUTLER.
WILLIAM HENRY HARDING.